United States Patent
Alghooneh et al.

(10) Patent No.: US 12,125,225 B1
(45) Date of Patent: Oct. 22, 2024

(54) MONOCULAR CAMERA SYSTEM PERFORMING DEPTH ESTIMATION OF OBJECTS SURROUNDING A VEHICLE

(71) Applicants: GM Global Technology Operations LLC, Detroit, MI (US); University of Waterloo, Waterloo (CA)

(72) Inventors: Ahmad R. Alghooneh, Waterloo (CA); Amir Khajepour, Waterloo (CA); Mansoor Alghooneh, Richmond Hill (CA); Brent Navin Roger Bacchus, Sterling Heights, MI (US); Neel Pratik Bhatt, Waterloo (CA); Ruihe Zhang, London (CA)

(73) Assignees: GM GLOBAL TECHNOLOGY OPERATIONS LLC, Detroit, MI (US); University of Waterloo, Waterloo, CA (US)

( * ) Notice: Subject to any disclaimer, the term of this patent is extended or adjusted under 35 U.S.C. 154(b) by 45 days.

(21) Appl. No.: 18/295,427

(22) Filed: Apr. 4, 2023

(51) Int. Cl.
G06T 7/55 (2017.01)
G06T 7/70 (2017.01)

(52) U.S. Cl.
CPC ...... *G06T 7/55* (2017.01); *G06T 2207/30252* (2013.01)

(58) Field of Classification Search
CPC ... G06T 7/55; G06T 7/70; G06T 2007/30261; G06T 2007/30252; B60R 2300/05; B60R 2300/302; B60R 2300/303; B60R 2300/304
See application file for complete search history.

(56) References Cited

U.S. PATENT DOCUMENTS

| | | | | |
|---|---|---|---|---|
| 8,102,427 | B2* | 1/2012 | Jung | G06T 7/73 348/208.1 |
| 8,213,677 | B2* | 7/2012 | Matsumoto | G06T 7/251 382/103 |
| 8,855,848 | B2* | 10/2014 | Zeng | G01S 13/865 701/28 |
| 10,108,866 | B2* | 10/2018 | Prinet | G06V 10/44 |
| 10,275,669 | B2* | 4/2019 | Uliyar | G06V 20/584 |
| 10,572,744 | B2* | 2/2020 | Shashua | B60R 11/04 |
| 10,861,176 | B2* | 12/2020 | Tong | G06F 18/251 |

(Continued)

OTHER PUBLICATIONS

Hartley, et al. "Multiple view geometry in computer vision," Cambridge University Press, 2004, Chapter 12, pp. 312-314.

*Primary Examiner* — Brian P Yenke
(74) *Attorney, Agent, or Firm* — Vivacqua Crane, PLLC

(57) ABSTRACT

A monocular camera system for a vehicle includes a front mono camera, a side mono camera, and one or more controllers in electronic communication with the front mono camera and the side mono camera. The one or more controllers execute instructions to determine an ideal lagged distance the vehicle travels between a current time step and a previous time step as two asynchronous camera frames are captured by the front mono camera and the side mono camera, determine a number of delayed frames captured by either the front mono camera or the side mono camera between the current time step and the previous time step based on the ideal lagged distance. The controllers determine a direction of travel of the vehicle that indicates which mono camera is selected to provide a previous camera frame captured at the previous time step.

20 Claims, 4 Drawing Sheets

(56) References Cited

U.S. PATENT DOCUMENTS

| | | | | |
|---|---|---|---|---|
| 10,897,600 | B1* | 1/2021 | Dabral | H04N 1/2129 |
| 11,184,531 | B2* | 11/2021 | Sypitkowski | B60R 1/27 |
| 11,245,858 | B2* | 2/2022 | Lee | H04N 23/958 |
| 11,379,995 | B2* | 7/2022 | Ning | G06T 7/246 |
| 11,774,983 | B1* | 10/2023 | Zhang | G05D 1/0272 |
| | | | | 701/28 |
| 11,858,420 | B2* | 1/2024 | Hariyani | G06T 3/047 |
| 2007/0154068 | A1* | 7/2007 | Stein | G01B 11/14 |
| | | | | 348/148 |
| 2017/0140231 | A1* | 5/2017 | Chen | G06F 18/2415 |
| 2018/0005054 | A1* | 1/2018 | Yu | G06N 3/08 |
| 2020/0014899 | A1* | 1/2020 | Miyamoto | H04N 23/88 |
| 2021/0035273 | A1* | 2/2021 | Deng | G06T 5/92 |
| 2021/0063200 | A1* | 3/2021 | Kroepfl | C03C 17/3644 |
| 2021/0261069 | A1* | 8/2021 | Oh | B60R 1/27 |
| 2021/0402927 | A1* | 12/2021 | Satomi | G06T 7/73 |
| 2022/0307233 | A1* | 9/2022 | Aratame | G06V 20/56 |
| 2023/0112004 | A1* | 4/2023 | Hari | G06F 11/3457 |
| | | | | 701/23 |
| 2023/0206596 | A1* | 6/2023 | Yamamoto | G06V 20/625 |
| | | | | 382/103 |

* cited by examiner

MONOCULAR CAMERA SYSTEM PERFORMING DEPTH ESTIMATION OF OBJECTS SURROUNDING A VEHICLE

INTRODUCTION

The present disclosure relates to a monocular camera system for a vehicle, where the monocular camera system performs depth estimation of an object.

An autonomous vehicle executes various tasks such as, but not limited to, perception, localization, mapping, path planning, decision making, and motion control. For example, an autonomous vehicle may include perception sensors such as one or more cameras for collecting image data regarding the environment surrounding the vehicle. The image data collected by the cameras may be used in various active systems that are part of the vehicle. In one specific example, the image data collected by the cameras may be used for curb detection and localization. However, it may be challenging to estimate the height and depth of an object based on a monocular camera system. That is, a monocular camera system may not be as robust when calculating a three-dimensional view of the world from a planar two-dimensional image frame received from a single camera when compared to a stereo vision camera system, which includes multiple cameras with overlapping field-of-views.

In one approach to alleviate the challenges faced with estimating height and depth of an object based on a monocular camera system, an additional close range depth sensor such as LiDAR, an ultrasonic sensor, or short-range radars may be introduced as part of the monocular camera system. However, the additional depth sensor introduces unnecessary complexity to the monocular camera system.

Thus, while camera systems for autonomous vehicles achieve their intended purpose, there is a need in the art for an improved approach for estimating the depth and height of an object based on a monocular camera system.

SUMMARY

According to several aspects, a monocular camera system for a vehicle is disclosed, and includes a front mono camera positioned at a front portion of the vehicle, a side mono camera positioned along a side of the vehicle, and one or more controllers in electronic communication with the front mono camera and the side mono camera. The one or more controllers executing instructions to collect image data captured by the front mono camera and the side mono camera, wherein the image data includes an object being evaluated. The controllers determine an ideal lagged distance the vehicle travels between a current time step and a previous time step as two asynchronous camera frames are captured by the front mono camera and the side mono camera. The controllers determine a number of delayed frames captured by either the front mono camera or the side mono camera between the current time step and the previous time step based on the ideal lagged distance. The controllers determine a direction of travel of the vehicle, wherein the direction of travel of the vehicle indicates which mono camera is selected to provide a previous camera frame captured at the previous time step. The controllers perform feature matching to identify pixel positions in a camera frame captured by the front mono camera and a camera frame captured by the side mono camera that correspond to the same three-dimensional coordinates of the object being evaluated. The controllers perform triangulation of the pixel positions captured by the front mono camera and the side mono camera to determine the three-dimensional coordinates of the object being evaluated.

In an aspect, the one or more controllers execute instructions to in response to determining the vehicle is traveling in a forward direction, select the previous camera frame in the image data captured by the front mono camera at the previous time step and the camera frame captured by the side mono camera at the current time step.

In another aspect, the one or more controllers execute instructions to in response to determining the vehicle is traveling in a backwards direction, select the previous camera frame in the image data captured by the side mono camera at the previous time step and the camera frame captured by the front mono camera at the current time step.

In yet another aspect, the number of delayed frames indicates how many frames are counted back in the image data captured by either the front mono camera or the side mono camera between the current time step and the previous time step.

In an aspect, the number of delayed frames is determined based on:

$$\text{camera frames} \cong \text{floor}\left(\left|\frac{s}{v_l}\right| \times FPS\right)$$

wherein $v_l$ is a longitudinal velocity of the vehicle, s represents the ideal lagged distance, FPS represents frames per second of a subject camera, and floor( ) represents an operator that returns the integer part of a floating point number.

In another aspect, determining the ideal lagged distance comprises solving for an area of overlap between a front field-of-view captured by the front mono camera and a side field-of-view captured by the side mono camera.

In yet another aspect, a steering angle of the vehicle is zero, and the area of overlap is determined by:

$$A \sim \int_{x_r}^{l_e} (L_1(x_r, y_r) - L_2) dx \underset{xr \sim cte}{\Longrightarrow} A \sim \int_{x_r}^{l_e} (L_1(y_r) - L_2) dx$$

wherein A represents the area of overlap, $L_1$ represents a line equation defining boundaries of a side field-of-view of the side mono camera, $L_2$ represents a line equation defining boundaries of a front field-of-view of the front mono camera, $x_r$ represents an x-position of the side mono camera, $y_r$ represents a y-position of the side mono camera, $l_e$ is an upper limit of the integration, x represent a lateral direction, and y represents the longitudinal direction.

In an aspect, the line equation defining boundaries of the side field-of-view of the side mono camera is solved as:

$$L_1 = \begin{cases} \tan\left(\frac{FOV_r}{2} + \psi_r\right)(x - x_r) + y_r & \text{if } y \geq y_r \\ -\tan\left(\frac{FOV_r}{2} + \psi_r\right)(x - x_r) + y_r & \text{if } y < y_r \end{cases}$$

wherein $FOV_r$ represents the side field-of-view for the side mono camera and $\psi_r$ is a yaw angle for the side mono camera.

In another aspect, the line equation defining boundaries of the front field-of-view of the front mono camera is solved as:

$$L_2 = \begin{cases} \tan\left(\frac{\pi}{2} - \frac{FOV_f}{2} + \psi_f\right)x & \text{if } x \geq 0 \\ -\tan\left(\frac{\pi}{2} - \frac{FOV_f}{2} + \psi_f\right)x & \text{if } x < 0 \end{cases}$$

wherein $FOV_f$ represents the front field-of-view for the front mono camera and $\psi_f$ is a yaw angle for the front mono camera.

In yet another aspect, determining the ideal lagged distance comprises:
 solving a convex optimization problem by plotting a relationship between a convex cost function and the ideal lagged distance, wherein the relationship between the convex cost function and the ideal lagged distance is represented by a parabola; and
 selecting a local minima of the parabola as the ideal lagged distance.

In an aspect, the convex cost function is expressed as:

$$\mathcal{J} = -\eta A^2 + s^2$$

wherein $\mathcal{J}$ is the convex cost function, s represents the ideal lagged distance, and $\eta$ represents a scalar.

In another aspect, a steering angle of the vehicle is a non-zero value, and the area of overlap is determined by:

$$A \sim \int_{x'_r}^{l_e} (L_1(x'_r, y'_r) - L_2) dx$$

wherein A represents the area of overlap, $L_1$ represents a line equation defining boundaries of a side field-of-view of the side mono camera, $L_2$ represents a line equation defining boundaries of a front field-of-view of the front mono camera, $x_r'$ represents an x-position of the side mono camera while turning, $y_r'$ represents a y-position of the side mono camera while turning, $l_e$ is an upper limit of the integration, and x represents a lateral direction.

In yet another aspect, a steering angle of the vehicle is a non-zero value, and the area of overlap is determined by:

$$\begin{pmatrix} x'_r \\ y'_r \\ 1 \end{pmatrix} = \begin{bmatrix} \cos(\theta) & -\sin(\theta) & R(1-\cos(\theta)) \\ \sin(\theta) & \cos(\theta) & R\sin(\theta) \\ 0 & 0 & 1 \end{bmatrix} \begin{pmatrix} x_r \\ y_r \\ 1 \end{pmatrix}$$

where $s = R\theta \Rightarrow R = \frac{s}{\theta}$ wherein R represents a radius of rotation of the vehicle, $\theta$ represents the steering angle of the vehicle, $x_r$ represents an x-position of the side mono camera, and $y_r$ represents a y-position of the side mono camera.

In an aspect, the line equation defining boundaries of the front field-of-view of the front mono camera is solved as:

$$L_1 = \begin{cases} \tan\left(\frac{FOV_r}{2} + \psi_r + \theta\right)(x - x'_r) + y'_r & \text{if } y \geq y'_r \\ -\tan\left(\frac{FOV_r}{2} + \psi_r + \theta\right)(x - x'_r) + y'_r & \text{if } y < y'_r \end{cases}$$

wherein $FOV_r$ represents the side field-of-view for the side mono camera, $\psi_r$ is a yaw angle for the side mono camera, and y represents the longitudinal direction.

In another aspect, the line equation defining boundaries of the side field-of-view of the side mono camera is solved as:

$$L_2 = \begin{cases} \tan\left(\frac{\pi}{2} - \frac{FOV_f}{2} + \psi_f\right)x & \text{if } x \geq 0 \\ -\tan\left(\frac{\pi}{2} - \frac{FOV_f}{2} + \psi_f\right)x & \text{if } x < 0 \end{cases}$$

wherein $FOV_f$ represents the front field-of-view for the front mono camera and $\psi_f$ is a yaw angle for the front mono camera.

In an aspect, a method for determining three-dimensional coordinates of an object by a monocular camera system for a vehicle is disclosed. The method includes collecting, by one or more controllers, image data captured by a front mono camera and a side mono camera, where the image data includes an object being evaluated. The method includes determining an ideal lagged distance the vehicle travels between a current time step and a previous time step as two asynchronous camera frames are captured by the front mono camera and the side mono camera. The method also includes determining a number of delayed frames captured by either the front mono camera or the side mono camera between the current time step and the previous time step based on the ideal lagged distance. The method further includes determining a direction of travel of the vehicle, wherein the direction of travel of the vehicle indicates which mono camera is selected to provide a previous camera frame captured at the previous time step. The method also includes performing feature matching to identify pixel positions in a camera frame captured by the front mono camera and a camera frame captured by the side mono camera that correspond to the same three-dimensional coordinates of the object being evaluated. Finally, the method includes performing triangulation of the pixel positions captured by the front mono camera and the side mono camera to determine the three-dimensional coordinates of the object being evaluated.

In another aspect, in response to determining the vehicle is traveling in a forward direction, the method includes selecting the previous camera frame in the image data captured by the front mono camera at the previous time step and the camera frame captured by the side mono camera at the current time step.

In yet another aspect, in response to determining the vehicle is traveling in a backwards direction, the method includes selecting the previous camera frame in the image data captured by the side mono camera at the previous time step and the camera frame captured by the front mono camera at the current time step.

In an aspect, the method further comprises solving for an area of overlap between a front field-of-view captured by the front mono camera and a side field-of-view captured by the side mono camera. The method includes solving a convex optimization problem by plotting a relationship between a convex cost function and the ideal lagged distance, where the relationship between the convex cost function and the ideal lagged distance is represented by a parabola. The method also includes selecting a local minima of the parabola as the ideal lagged distance.

In another aspect, monocular camera system for a vehicle is disclosed, and includes a front mono camera positioned at a front portion of the vehicle, a side mono camera positioned along a side of the vehicle, and one or more controllers in electronic communication with the front mono camera and the side mono camera. The one or more controllers execute instructions to collect image data captured by the front mono camera and the side mono camera, where the image data includes an object being evaluated. The controllers determine an ideal lagged distance the vehicle travels between a current time step and a previous time step as two asynchronous camera frames are captured by the front mono camera and the side mono camera. Determining the ideal lagged distance comprises solving for an area of overlap between a front field-of-view captured by the front mono camera and a side field-of-view captured by the side mono camera, solving a convex optimization problem by plotting a relationship between a convex cost function and the ideal lagged distance, wherein the relationship between the convex cost function and the ideal lagged distance is represented by a parabola, and selecting a local minima of the parabola as the ideal lagged distance. The controllers determine a number of delayed frames captured by either the front mono camera or the side mono camera between the current time step and the previous time step based on the ideal lagged distance. The controllers determine a direction of travel of the vehicle, where the direction of travel of the vehicle indicates which mono camera is selected to provide a previous camera frame captured at the previous time step. The controllers perform feature matching to identify pixel positions in a camera frame captured by the front mono camera and a camera frame captured by the side mono camera that correspond to the same three-dimensional coordinates of the object being evaluated. The controllers perform triangulation of the pixel positions captured by the front mono camera and the side mono camera to determine the three-dimensional coordinates of the object being evaluated.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
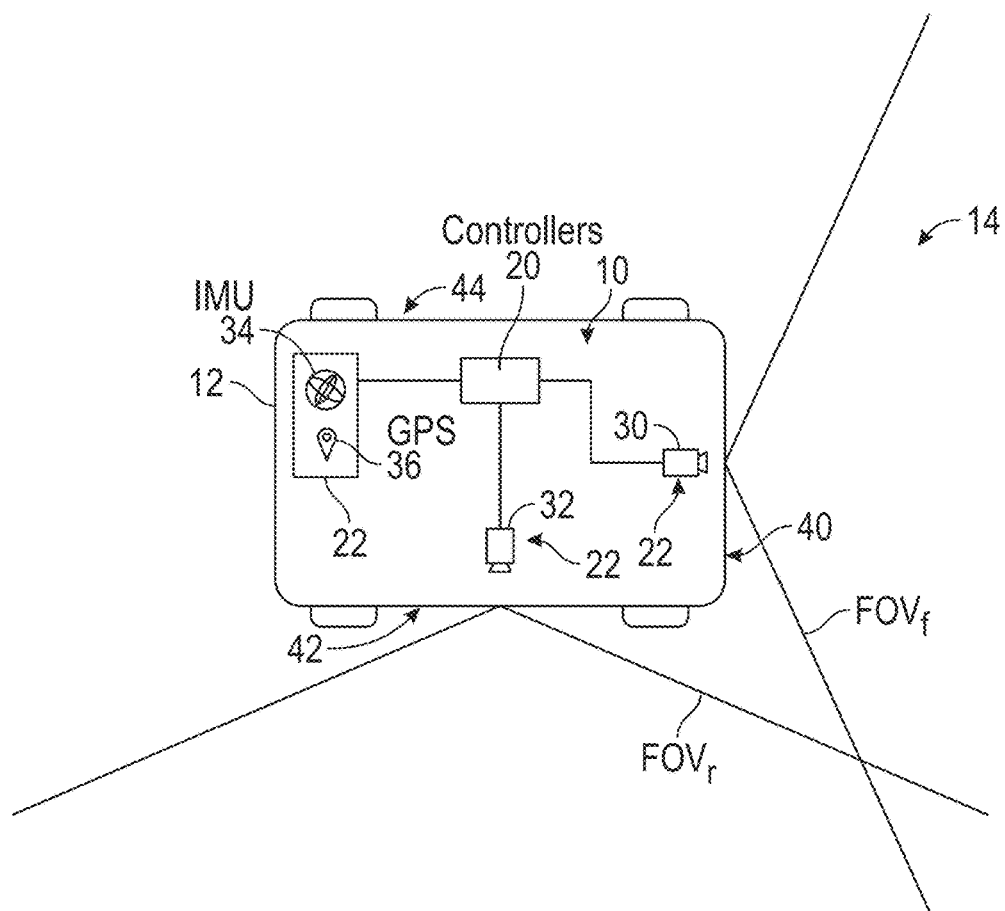
FIG. 1 is a schematic diagram of a vehicle including the disclosed monocular camera system including one or more controllers in electronic communication with a front camera and a side camera, according to an exemplary embodiment.

Referring to FIG. 1, an exemplary monocular camera system 10 for depth estimation of an object is illustrated in FIG. 1. The monocular camera system 10 is part of a vehicle 12. It is to be appreciated that the vehicle 12 may be any type of vehicle such as, but not limited to, a sedan, truck, sport utility vehicle, van, or motor home. In one embodiment, the monocular camera system 10 is part of an automated driving system (ADS) or an advanced driver assistance system (ADAS) for assisting a driver with steering, braking, and/or accelerating, however, the monocular camera system 10 may be used as part of a manually driven vehicle as well. The monocular camera system 10 includes one or more controllers 20 in electronic communication with a plurality of perception sensors 22 that collect perception indicative of an environment 14 surrounding the vehicle 12. The perception sensors 22 include a plurality of mono cameras 30, 32, an inertial measurement unit (IMU) 34, and a global positioning system (GPS) 36, however, is to be appreciated that additional or different perception sensors may be used as well.

In the example as shown in FIG. 1, the one or more controllers 20 are in electronic communication with a front mono camera 30 and a side mono camera 32, where the front mono camera 30 is positioned at a front portion 40 of the vehicle 12 to capture a front field-of-view $FOV_f$ and the side mono camera 32 is positioned along a right side 42 of the vehicle 12 to capture a side field-of-view $FOV_r$. Although FIG. 1 illustrates the side mono camera 32 positioned along the right side 42 of the vehicle 12, it is to be appreciated that the figures are merely exemplary in nature, and in another embodiment the side mono camera 32 is positioned along a left side 44 of the vehicle 12 instead. FIG. 1 illustrates a negligible amount of overlap between the front field-of-view $FOV_f$ and the right field-of-view $FOV_r$ when the vehicle 12 is stationary, where the negligible amount of overlap may be disregarded and the mono cameras 30, 32 are considered to have non-overlapping field-of-views. As explained below, the monocular camera system 10 creates a temporal overlap of the front field-of-view $FOV_f$ captured at a first time step and the right field-of-view $FOV_r$ captured at a second time step that are leveraged to perform stereo camera depth estimation.

Figure 2:
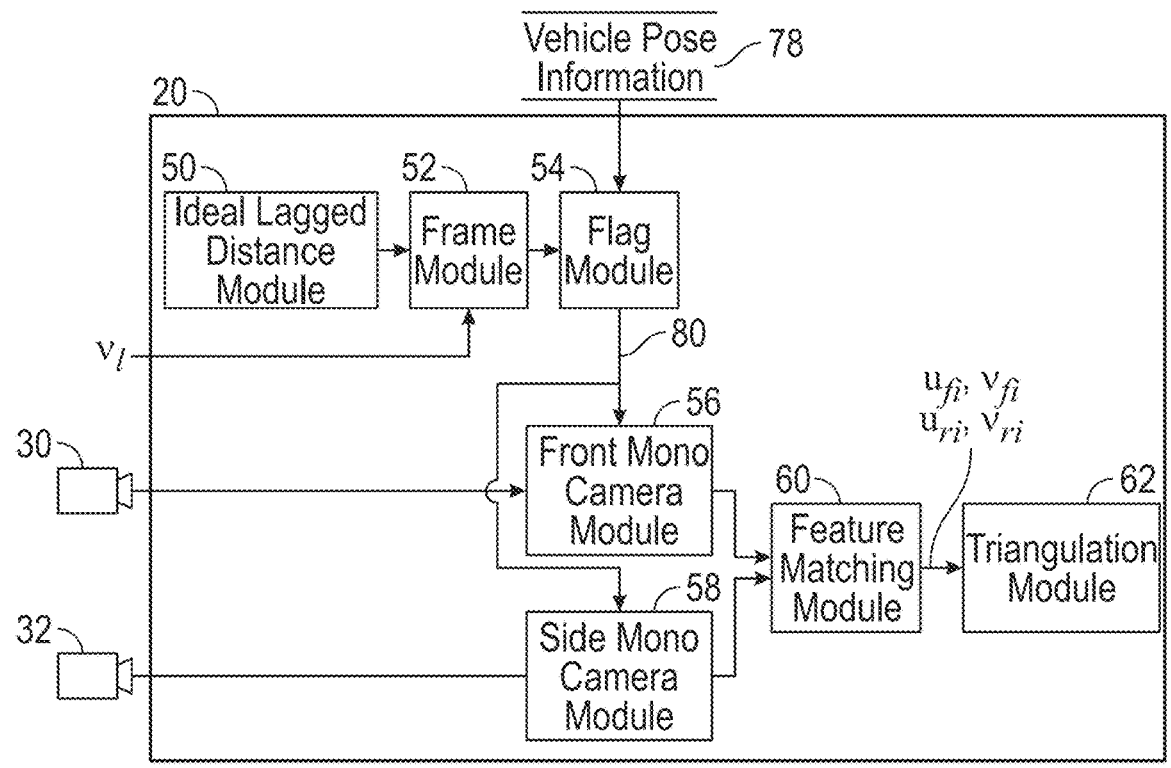
FIG. 2 is a block diagram of the one or more controllers shown in FIG. 1, according to an exemplary embodiment.

FIG. 2 is a block diagram of the one or more controllers 20 shown in FIG. 1. The one or more controllers 20 include an ideal lagged distance module 50, a frame module 52, a flag module 54, a front mono camera module 56, a side mono camera module 58, a feature matching module 60, and a triangulation module 62. Referring to both FIGS. 1 and 2, the ideal lagged distance module 50 of the one or more controllers 20 collects image data captured by the front mono camera 30 and the side mono camera 32, where the image data includes one or more objects being evaluated for depth. For example, in one non-limiting embodiment, the one or more objects include a curb that is part of a scene that surrounds the vehicle 12.

Figure 3:
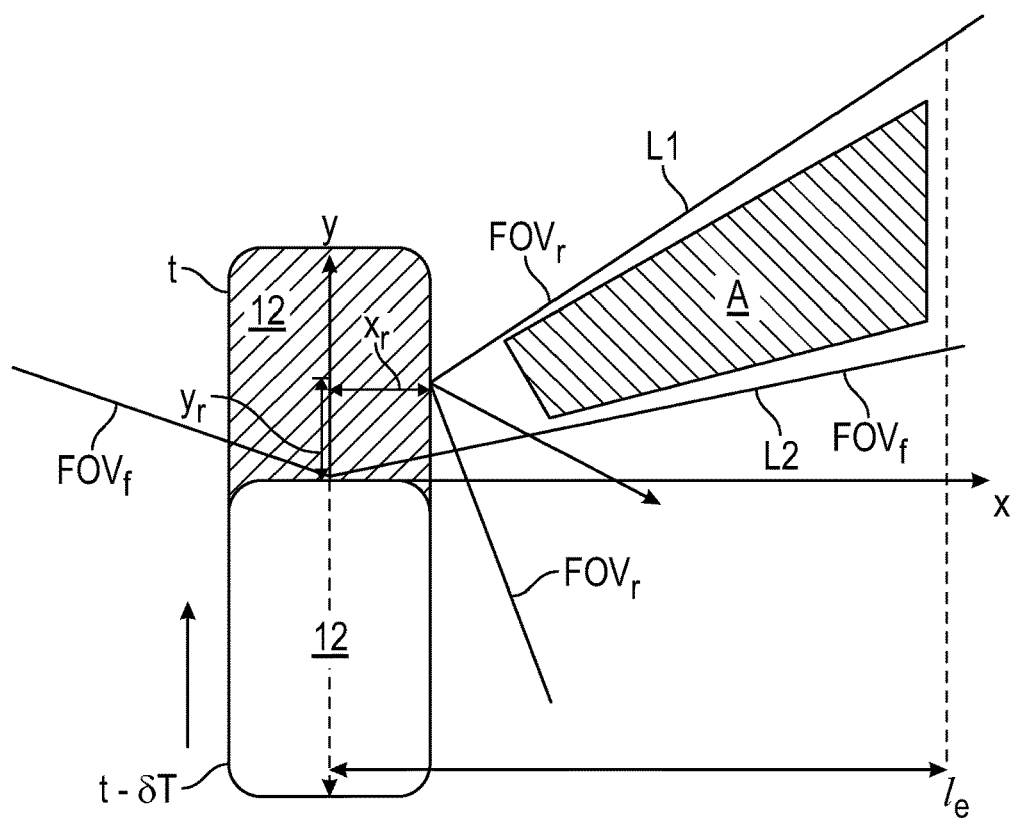
FIG. 3 is an exemplary diagram of the vehicle shown in FIG. 1 traveling in a forward direction, according to an exemplary embodiment.

The ideal lagged distance module 50 of the one or more controllers 20 determines an ideal lagged distance s that the vehicle 12 travels between a current time step t and a previous time step t−δT as two asynchronous camera frames are captured by the front mono camera 30 and the side mono camera 32. The previous time step t−δT is measured between the current time step t and a change in time δT. In the event the vehicle 12 travels in a forward direction as shown in FIG. 3, then a front camera frame is captured at the previous time step t−δT and a side camera frame is captured at the current time step t. In the event the vehicle 12 travels in a backwards direction, then the front camera frame is captured at the current time step t and the side camera is captured at the previous time step t−δT. Finally, in the event the vehicle 12 turns, then the front camera frame is captured at the previous time step t−δT and the side camera frame is captured at the current time step t.

FIG. 3 is an exemplary diagram of the vehicle 12 traveling in the forward direction without turning, where the ideal lagged distance module 50 of the one or more controllers 20 (FIG. 2) solves for an area of overlap A between the front field-of-view $FOV_f$ captured by the front mono camera 30 and the side field-of-view $FOV_r$ captured by the side mono camera 32. It is to be appreciated that the ideal lagged distance s is optimized to maximize the area of overlap A between the two field-of-views captured by the two mono cameras 30, 32 while at the same time minimizing an amount of delay between the current time step t and the previous time step t−δT.

Figure 5:
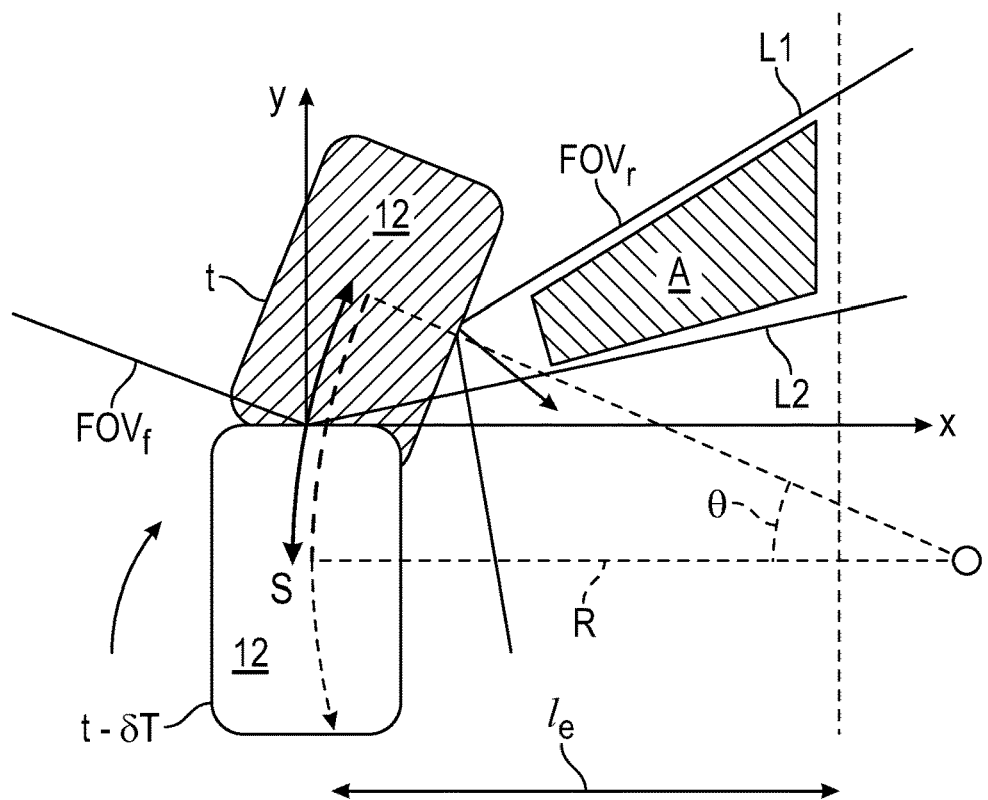
FIG. 5 is an exemplary diagram of the vehicle shown in FIG. 1 traveling in a forward direction at a steering angle, according to an exemplary embodiment.

In the example as shown in FIG. 3, a steering angle θ of the vehicle 12 is zero. FIG. 5 is an illustration of the vehicle turning where the steering angle θ is a non-zero value, which is described below. Referring to FIGS. 2 and 3, the area of overlap A is determined by integrating a difference between a line equation $L_1$ defining the boundaries of the side field-of-view $FOV_r$ and a line equation $L_2$ defining the boundaries of the front field-of-view $FOV_f$, and is expressed in Equation 1 as:

$$A \sim \int_{x_r}^{l_e}(L_1(x_r, y_r) - L_2)dx \underset{x \sim cte}{\Longrightarrow} A \sim \int_{x_r}^{l_e}(L_1(y_r) - L_2)dx \quad \text{Equation 1}$$

where $x_r$ represents an x-position of the side mono camera 32, $y_r$ represents a y-position of the side mono camera 32, $l_e$ is the upper limit of the integration, cte represents a constant, x the lateral direction, and y is the longitudinal direction. In the example, the x-position $x_r$ of the side mono camera 32 remains constant. The upper limit $l_e$ of the integration is based on an area being evaluated for depth estimation. In one example where the monocular camera system 10 is used for curb detection, the upper limit $l_e$ for integration is about 5 meters. The line equations $L_1$ and $L_2$ are expressed in Equations 2 and 3 as:

$$L_1 = \begin{cases} \tan\left(\frac{FOV_r}{2} + \psi_r\right)(x - x_r) + y_r & \text{if } y \geq y_r \\ -\tan\left(\frac{FOV_r}{2} + \psi_r\right)(x - x_r) + y_r & \text{if } y < y_r \end{cases} \quad \text{Equation 2}$$

$$L_2 = \begin{cases} \tan\left(\frac{\pi}{2} - \frac{FOV_f}{2} + \psi_f\right)x & \text{if } x \geq 0 \\ -\tan\left(\frac{\pi}{2} - \frac{FOV_f}{2} + \psi_f\right)x & \text{if } x < 0 \end{cases} \quad \text{Equation 3}$$

where $\psi_f$ is the yaw angle of the front mono camera 30 and $\psi_r$ is the yaw angle for the side mono camera 32.

Figure 4:
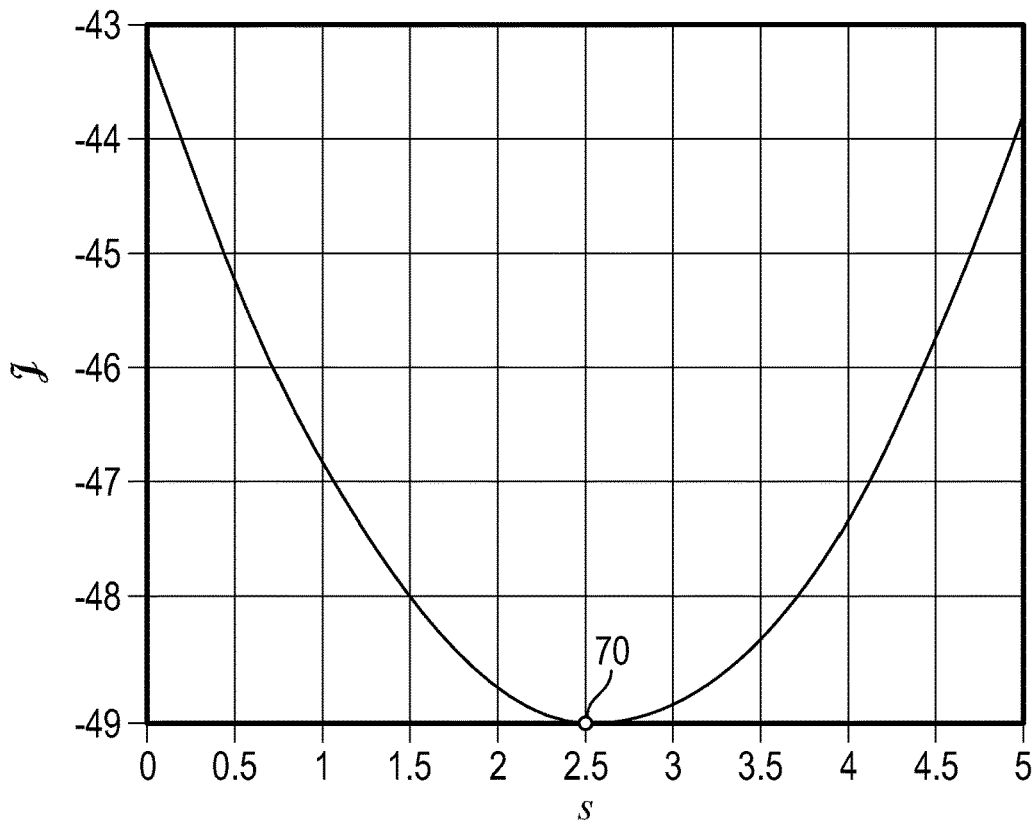
FIG. 4 is a graph illustrating a relationship between a convex cost function and an ideal lagged distance when a steering angle of the vehicle is zero, according to an exemplary embodiment.

Once the area of overlap A is solved, the ideal lagged distance module 50 of the one or more controllers 20 (FIG. 2) determines the ideal lagged distance s by solving a convex optimization problem. The convex optimization problem is based on a convex cost function $\mathcal{J}$, where the convex cost function $\mathcal{J}$ minimizes the ideal lagged distance s while maximizing the area of overlap A. FIG. 4 is a graph illustrating a relationship between the convex cost function $\mathcal{J}$ and the ideal lagged distance s. The convex optimization is solved by plotting the relationship between the convex cost function $\mathcal{J}$ (along the y-axis) and the ideal lagged distance s (along the x-axis), where the relationship between the convex cost function $\mathcal{J}$ and the ideal lagged distance s is represented by a parabola and the ideal lagged distance s is selected as the local minima 70 of the parabola. The convex cost function $\mathcal{J}$ is a function of the area of overlap A, the ideal lagged distance s, and a scalar η, and is expressed in Equation 4 as:

$$\mathcal{J} = -\eta A^2 + s^2 \quad \text{Equation 4}$$

where the scalar η is selected to balance the relationship between the area of overlap A and the ideal lagged distance s.

In the embodiment as shown in FIGS. 3 and 4, the vehicle 12 is steered in a straight direction, where the steering angle θ is zero. However, in the event the steering angle θ is a non-zero value, then as the steering angle θ increases, the ideal lagged distance s decreases. FIG. 5 is an exemplary diagram of the vehicle 12 traveling in the forward direction at the steering angle θ. The area of overlap A is determined by integrating a difference between the line equation $L_1$ defining the boundaries of the side field-of-view $FOV_r$ and the line equation $L_2$ defining the boundaries of the front field-of-view $FOV_f$, and is expressed in Equation 5 as:

$$A \sim \int_{x_r'}^{l_e}(L_1(x_r', y_r') - L_2)dx \quad \text{Equation 5}$$

where $x_r'$ represents an x-position of the side mono camera 32 while the vehicle 12 is turning and $y_r'$ represents a y-position of the side mono camera 32 while the vehicle is turning. The x-position $x_r'$ and the y-position $y_r'$ are expressed in Equations 6 and 7 as:

$$\begin{pmatrix} x_r' \\ y_r' \\ 1 \end{pmatrix} = \begin{bmatrix} \cos(\theta) & -\sin(\theta) & R(1 - \cos(\theta)) \\ \sin(\theta) & \cos(\theta) & R\sin(\theta) \\ 0 & 0 & 1 \end{bmatrix} \begin{pmatrix} x_r \\ y_r \\ 1 \end{pmatrix} \quad \text{Equation 6}$$

$$\text{where } s = R\theta \Rightarrow R = \frac{s}{\theta} \quad \text{Equation 7}$$

where R represents a radius of rotation of the vehicle 12 $x_r$, represents an x-position of the side mono camera 32, and $y_r$ represents a y-position of the side mono camera 32. The line equations L1 and L2 are expressed in Equations 8 and 9 as:

$$L_1 = \begin{cases} \tan\left(\frac{FOV_r}{2} + \psi_r + \theta\right)(x - x_r') + y_r' & \text{if } y \geq y_r' \\ -\tan\left(\frac{FOV_r}{2} + \psi_r + \theta\right)(x - x_r') + y_r' & \text{if } y < y_r' \end{cases} \quad \text{Equation 8}$$

$$L_2 = \begin{cases} \tan\left(\frac{\pi}{2} - \frac{FOV_f}{2} + \psi_f\right)x & \text{if } x \geq 0 \\ -\tan\left(\frac{\pi}{2} - \frac{FOV_f}{2} + \psi_f\right)x & \text{if } x < 0 \end{cases} \quad \text{Equation 9}$$

Figure 6:
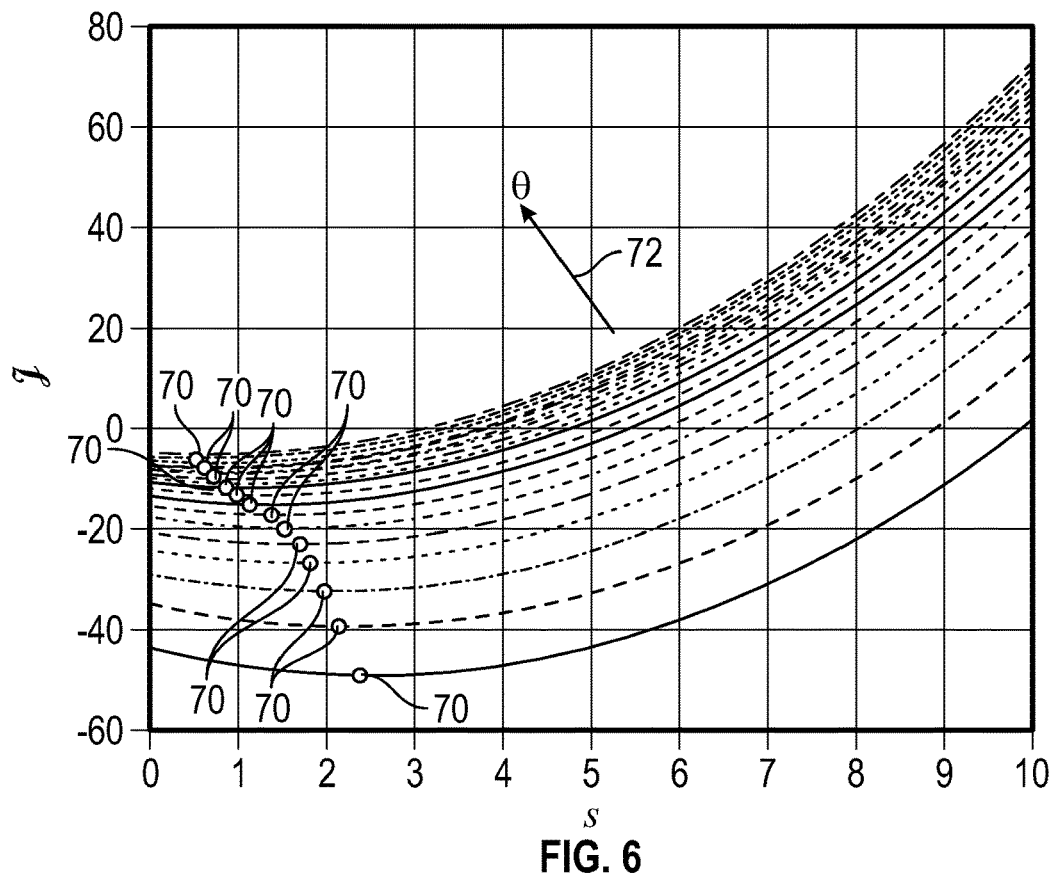
FIG. 6 is a graph illustrating a relationship between a convex cost function and the ideal lagged distance as the steering angle of the vehicle increases, according to an exemplary embodiment.

Once the area of overlap A is solved, the ideal lagged distance module 50 of the one or more controllers 20 (FIG. 2) solves for the ideal lagged distance s by solving a convex optimization problem based on a convex cost function $\mathcal{J}|\theta$ that accounts for the the steering angle θ. FIG. 6 is a graph illustrating the relationship between the convex cost function $\mathcal{J}|\theta$ that accounts for the the steering angle θ and the ideal lagged distance s as a value of the steering angle θ, where an arrow 72 indicates an increasing value of the steering angle θ. As the steering angle θ increases in value, the ideal lagged distance s, which is represented by the local minima 70 of the parabola of each convex cost function $\mathcal{J}|\theta$, decreases. It is also to be appreciated that as the steering angle θ increases in value, overall cost function $\mathcal{J}|\theta$ also increases. This is because as the steering angle θ (i.e., the vehicle 12 turns at a sharper angle) the area of overlap A decreases.

Referring to FIG. 2, once the ideal lagged distance module 50 of the one or more controllers 20 solves for the ideal lagged distance s, the frame module 52 determines a number of camera frames between the current time step t and the previous time step t−δT based on the ideal lagged distance s, where the number of frames indicates how many camera frames are exist between the current time step t and the previous time step t−δT. The number of camera frames is determined based on Equation 10, which is:

$$\text{camera frames} \cong \text{floor}\left(\left|\frac{s}{v_l}\right| \times FPS\right) \quad \text{Equation 10}$$

where $v_l$ is a longitudinal velocity of the vehicle 12, s represents the ideal lagged distance, FPS represents frames per second of a subject camera, and floor( ) represents an operator that returns the integer part of a floating point number so the number of frames is a whole number.

The flag module 54 of the one or more controllers 20 receives vehicle pose information 78 as input. The flag module 54 of the one or more controllers 20 determine a direction of travel of the vehicle 12 based on the vehicle pose information 78. As explained below, the direction of travel of the vehicle 12 indicates which mono camera 30, 32 is selected to provide a previous camera frame captured at the the previous time step t−δT. The flag module 54 also updates an extrinsic matrix of either the front mono camera 30 or the side mono camera 32 based on the direction of travel of the vehicle 12, where updating the extrinsic matrix indicates a previous camera frame in the image data captured at the previous time step t−δT is to be used when determining the three-dimensional coordinates of an object. Specifically, in the event the vehicle 12 travels in the forward direction, then the extrinsic matrix for the front mono camera 30 is updated. In the event the vehicle 12 travels in a backwards direction, then the extrinsic matrix for the side mono camera 32 is updated.

The flag module 54 of the one or more controllers 20 may then transmit a flag 80 to either the front mono camera module 56 or the side mono camera module 58 depending upon the direction of travel of the vehicle 12. In response to determining the vehicle 12 is traveling in the forward direction, the flag module 54 transmits the flag 80 to the front mono camera module 56, and the front mono camera module 56 selects the previous camera frame in the image data captured by the front mono camera 30 at the previous time step t−δT. The side mono camera module 58 selects the camera frame captured by the side mono camera 32 at the current time step t. In response to determining the vehicle 12 is traveling in the backwards direction, the flag module 54 transmits the flag 80 to the side mono camera module 58, and the side mono camera module 58 selects the previous camera frame in the image data captured by the side mono camera 32 at the previous time step t−δT. The front mono camera module 56 selects the camera frame captured by the front mono camera 30 at the current time step t.

The feature matching module 60 of the one or more controllers 20 then performs feature matching to identify pixel positions in the camera frame captured by the front mono camera 30 and the camera frame captured by the side mono camera 32 that correspond to the same three-dimensional coordinates of an object being evaluated. Specifically, $u_{fi}$, $v_{fi}$ represent the horizontal and vertical pixel positions of a corresponding matched feature captured by the front mono camera 30 respectively, and $u_{ri}$, $v_{ri}$ represent the vertical and horizontal pixel positions of a corresponding matched feature captured by the side mono camera 32. The triangulation module 62 then performs triangulation of the vertical and horizontal pixel positions captured by the front mono camera 30 and the side mono camera 32 to determine the three-dimensional coordinates of the object being evaluated, where the depth of the object is indicated by the three-dimensional coordinates.

Figure 7:
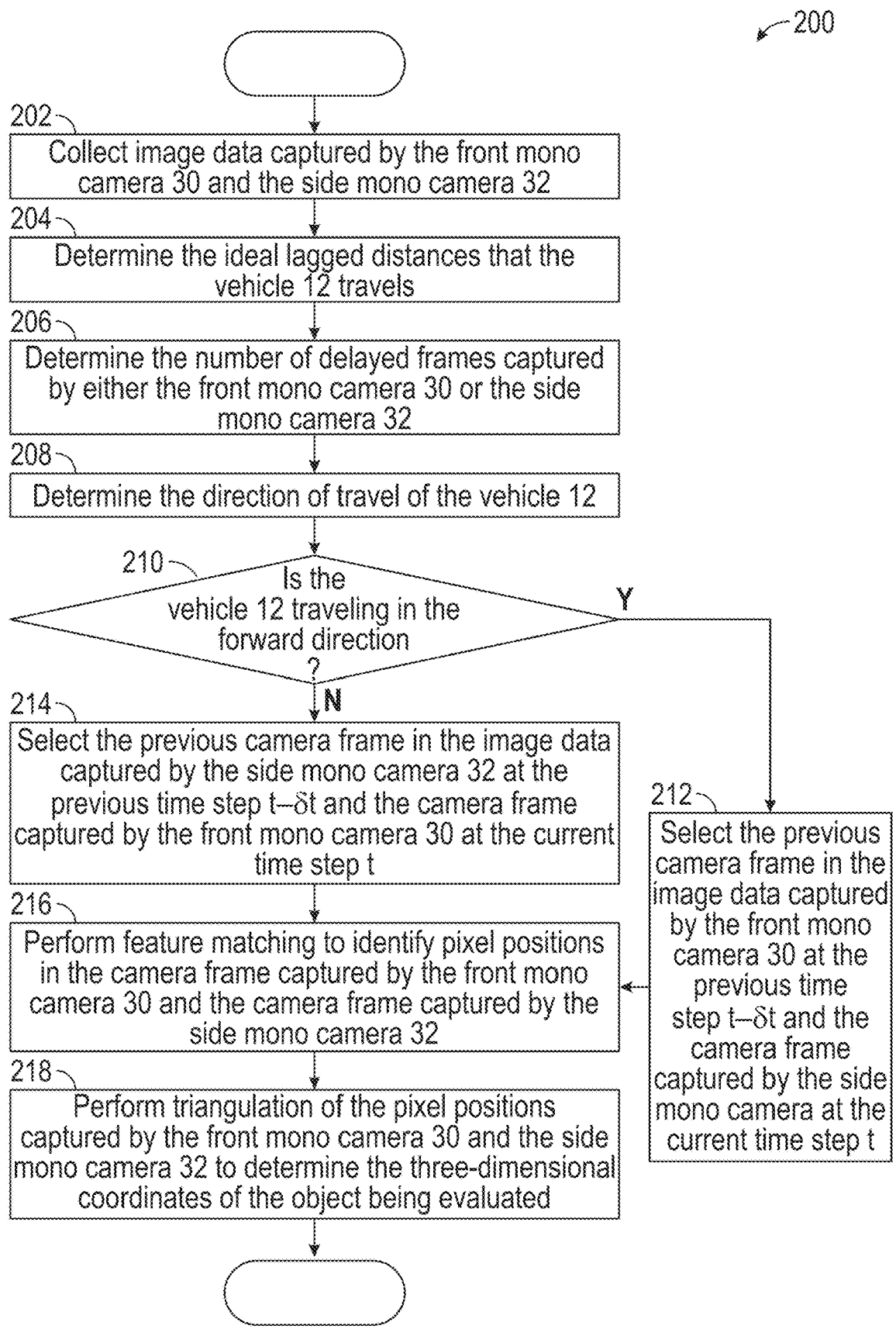
FIG. 7 process flow diagram illustrating a method for determining the three-dimensional coordinates of an object by the monocular camera system, according to an exemplary embodiment.

FIG. 7 is an exemplary process flow diagram illustrating a method 200 for determining the three-dimensional coordinates of an object by the monocular camera system 10. Referring generally to FIGS. 1-7, the method 200 may begin at block 202. In block 202, the ideal lagged distance module 50 of the one or more controllers 20 collects image data captured by the front mono camera 30 and the side mono camera 32, where the image data includes an object being evaluated. The method 200 may then proceed to block 204.

In block 204, the ideal lagged distance module 50 of the one or more controllers 20 determines the ideal lagged distance s that the vehicle 12 travels between a current time step t and a previous time step t−δT as two asynchronous camera frames are captured by the front mono camera 30 and the side mono camera 32. The method 200 may then proceed to block 206.

In block 206, the frame module 52 determines the number of delayed frames captured by either the front mono camera 30 or the side mono camera 32 between the current time step t and the previous time step t−δT based on the ideal lagged distance s. The method 200 method 200 may then proceed to block 208.

In block 208, the flag module 54 of the one or more controllers 20 determines the direction of travel of the vehicle 12, where the direction of travel of the vehicle 12 indicates which mono camera 30, 32 is selected to provide the previous camera frame captured at the previous time step t−δT. The method 200 may then proceed to decision block 210.

In decision block 210, in response to determining the vehicle is traveling in the forward direction, the method proceeds to block 212. In block 212, the flag module 54 selects the previous camera frame in the image data captured by the front mono camera 30 at the previous time step t−δT and the camera frame captured by the side mono camera at the current time step t. The method 200 may then proceed to block 216. Referring to decision block 210, in response to determining the vehicle 12 is traveling in the backwards direction, the method proceeds to block 214. In block 214, the flag module 54 selects the previous camera frame in the image data captured by the side mono camera 32 at the previous time step t−δT and the camera frame captured by the front mono camera 30 at the current time step t. The method 200 may then proceed to block 216.

In block 216, feature matching module 60 of the one or more controllers 20 performs feature matching to identify pixel positions in the camera frame captured by the front mono camera 30 and the camera frame captured by the side mono camera 32 that correspond to the same three-dimensional coordinates of the object being evaluated. The method 200 may then proceed to block 218.

In block 218, the triangulation module 62 of the one or more controllers 20 perform triangulation of the pixel positions captured by the front mono camera 30 and the side mono camera 32 to determine the three-dimensional coordinates of the object being evaluated. The method 200 may then terminate.

Referring generally to the figures, the disclosed monocular camera system provides various technical effects and benefits. Specifically, the monocular camera system employs current and temporal camera frames captured from two mono cameras having non-overlapping field-of-views to provide stereo camera depth estimation. The monocular camera system determines an ideal lagged distance the vehicle travels as two asynchronous camera frames are captured by the front mono camera and the side mono camera, where the ideal lagged distance is optimized to maximize the area of overlap between the two field-of-views captured by the two mono cameras while at the same time minimizing an amount of delay between the current time step and the previous time step. It is to be appreciated that the monocular camera system may estimate the depth of objects without utilizing additional close range depth sensors such as LiDAR, ultrasonic sensors, or short-range radars.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A monocular camera system for a vehicle, the monocular camera system comprising:
   a front mono camera positioned at a front portion of the vehicle;
   a side mono camera positioned along a side of the vehicle; and
   one or more controllers in electronic communication with the front mono camera and the side mono camera, the one or more controllers executing instructions to:
      collect image data captured by the front mono camera and the side mono camera, wherein the image data includes an object being evaluated;
      determine an ideal lagged distance the vehicle travels between a current time step and a previous time step as two asynchronous camera frames are captured by the front mono camera and the side mono camera;
      determine a number of delayed frames captured by either the front mono camera or the side mono camera between the current time step and the previous time step based on the ideal lagged distance;
      determine a direction of travel of the vehicle, wherein the direction of travel of the vehicle indicates which mono camera is selected to provide a previous camera frame captured at the previous time step;
      perform feature matching to identify pixel positions in a camera frame captured by the front mono camera and a camera frame captured by the side mono camera that correspond to the same three-dimensional coordinates of the object being evaluated; and
      perform triangulation of the pixel positions captured by the front mono camera and the side mono camera to determine the three-dimensional coordinates of the object being evaluated.

2. The monocular camera system of claim 1, wherein the one or more controllers execute instructions to:
   in response to determining the vehicle is traveling in a forward direction, select the previous camera frame in the image data captured by the front mono camera at the previous time step and the camera frame captured by the side mono camera at the current time step.

3. The monocular camera system of claim 1, wherein the one or more controllers execute instructions to:
   in response to determining the vehicle is traveling in a backwards direction, select the previous camera frame in the image data captured by the side mono camera at the previous time step and the camera frame captured by the front mono camera at the current time step.

4. The monocular camera system of claim 1, wherein the number of delayed frames indicates how many frames are counted back in the image data captured by either the front mono camera or the side mono camera between the current time step and the previous time step.

5. The monocular camera system of claim 1, wherein the number of delayed frames is determined based on:

$$\text{camera frames} \cong \text{floor}\left(\left|\frac{s}{v_l}\right| \times FPS\right)$$

wherein $v_l$ is a longitudinal velocity of the vehicle, s represents the ideal lagged distance, FPS represents frames per second of a subject camera, and floor( ) represents an operator that returns the integer part of a floating point number.

6. The monocular camera system of claim 1, wherein determining the ideal lagged distance comprises:
   solving for an area of overlap between a front field-of-view captured by the front mono camera and a side field-of-view captured by the side mono camera.

7. The monocular camera system of claim 6, wherein a steering angle of the vehicle is zero, and the area of overlap is determined by:

$$A \sim \int_{x_r}^{l_e} (L_1(x_r, y_r) - L_2) dx \underset{xr \sim cte}{\Longrightarrow} A \sim \int_{x_r}^{l_e} (L_1(y_r) - L_2) dx$$

wherein A represents the area of overlap, $L_1$ represents a line equation defining boundaries of a side field-of-view of the side mono camera, $L_2$ represents a line equation defining boundaries of a front field-of-view of the front mono camera, $x_r$ represents an x-position of the side mono camera, $y_r$ represents a y-position of the side mono camera, $l_e$ is an upper limit of the integration, x represent a lateral direction, and y represents the longitudinal direction.

8. The monocular camera system of claim 7, wherein the line equation defining boundaries of the side field-of-view of the side mono camera is solved as:

$$L_1 = \begin{cases} \tan\left(\dfrac{FOV_r}{2} + \psi_r\right)(x - x_r) + y_r & \text{if } y \geq y_r \\ -\tan\left(\dfrac{FOV_r}{2} + \psi_r\right)(x - x_r) + y_r & \text{if } y < y_r \end{cases}$$

wherein $FOV_r$ represents the side field-of-view for the side mono camera and $\psi_r$ is a yaw angle for the side mono camera.

9. The monocular camera system of claim 7, wherein the line equation defining boundaries of the front field-of-view of the front mono camera is solved as:

$$L_2 = \begin{cases} \tan\left(\dfrac{\pi}{2} - \dfrac{FOV_f}{2} + \psi_f\right)x & \text{if } x \geq 0 \\ -\tan\left(\dfrac{\pi}{2} - \dfrac{FOV_f}{2} + \psi_f\right)x & \text{if } x < 0 \end{cases}$$

wherein $FOV_f$ represents the front field-of-view for the front mono camera and $\psi_f$ is a yaw angle for the front mono camera.

10. The monocular camera system of claim 6, wherein determining the ideal lagged distance comprises:
solving a convex optimization problem by plotting a relationship between a convex cost function and the ideal lagged distance, wherein the relationship between the convex cost function and the ideal lagged distance is represented by a parabola; and
selecting a local minima of the parabola as the ideal lagged distance.

11. The monocular camera system of claim 10, wherein the convex cost function is expressed as:

$$\mathcal{J} = -\eta A^2 + s^2$$

wherein $\mathcal{J}$ is the convex cost function, s represents the ideal lagged distance, and $\eta$ represents a scalar.

12. The monocular camera system of claim 6, wherein a steering angle of the vehicle is a non-zero value, and the area of overlap is determined by:

$$A \sim \int_{x_r'}^{l_e} (L_1(x_r', y_r') - L_2) dx$$

wherein A represents the area of overlap, $L_1$ represents a line equation defining boundaries of a side field-of-view of the side mono camera, $L_2$ represents a line equation defining boundaries of a front field-of-view of the front mono camera, $x_r'$ represents an x-position of the side mono camera while turning, $y_r'$ represents a y-position of the side mono camera while turning, $l_e$ is an upper limit of the integration, and x represents a lateral direction.

13. The monocular camera system of claim 12, wherein a steering angle of the vehicle is a non-zero value, and the area of overlap is determined by:

$$\begin{pmatrix} x_r' \\ y_r' \\ 1 \end{pmatrix} = \begin{bmatrix} \cos(\theta) & -\sin(\theta) & R(1-\cos(\theta)) \\ \sin(\theta) & \cos(\theta) & R\sin(\theta) \\ 0 & 0 & 1 \end{bmatrix} \begin{pmatrix} x_r \\ y_r \\ 1 \end{pmatrix}$$

where $s = R\theta \Rightarrow R = \dfrac{s}{\theta}$ wherein R represents a radius of rotation of the vehicle, $\theta$ represents the steering angle of the vehicle, $x_r$ represents an x-position of the side mono camera, and $y_r$ represents a y-position of the side mono camera.

14. The monocular camera system of claim 13, wherein the line equation defining boundaries of the front field-of-view of the front mono camera is solved as:

$$L_1 = \begin{cases} \tan\left(\dfrac{FOV_r}{2} + \psi_r + \theta\right)(x - x_r') + y_r' & \text{if } y \geq y_r' \\ -\tan\left(\dfrac{FOV_r}{2} + \psi_r + \theta\right)(x - x_r') + y_r' & \text{if } y < y_r' \end{cases}$$

wherein $FOV_r$ represents the side field-of-view for the side mono camera, $\psi_r$ is a yaw angle for the side mono camera, and y represents the longitudinal direction.

15. The monocular camera system of claim 13, wherein the line equation defining boundaries of the side field-of-view of the side mono camera is solved as:

$$L_2 = \begin{cases} \tan\left(\dfrac{\pi}{2} - \dfrac{FOV_f}{2} + \psi_f\right)x & \text{if } x \geq 0 \\ -\tan\left(\dfrac{\pi}{2} - \dfrac{FOV_f}{2} + \psi_f\right)x & \text{if } x < 0 \end{cases}$$

wherein $FOV_f$ represents the front field-of-view for the front mono camera and $\psi_f$ is a yaw angle for the front mono camera.

16. A method for determining three-dimensional coordinates of an object by a monocular camera system for a vehicle, the method comprising:
collecting, by one or more controllers, image data captured by a front mono camera and a side mono camera, wherein the image data includes an object being evaluated;
determining an ideal lagged distance the vehicle travels between a current time step and a previous time step as two asynchronous camera frames are captured by the front mono camera and the side mono camera;
determining a number of delayed frames captured by either the front mono camera or the side mono camera between the current time step and the previous time step based on the ideal lagged distance;
determining a direction of travel of the vehicle, wherein the direction of travel of the vehicle indicates which mono camera is selected to provide a previous camera frame captured at the previous time step;
performing feature matching to identify pixel positions in a camera frame captured by the front mono camera and a camera frame captured by the side mono camera that correspond to the same three-dimensional coordinates of the object being evaluated; and
performing triangulation of the pixel positions captured by the front mono camera and the side mono camera to determine the three-dimensional coordinates of the object being evaluated.

17. The method of claim 16, wherein the method further comprises:
in response to determining the vehicle is traveling in a forward direction, selecting the previous camera frame in the image data captured by the front mono camera at the previous time step and the camera frame captured by the side mono camera at the current time step.

18. The method of claim 16, wherein the method further comprises:
in response to determining the vehicle is traveling in a backwards direction, selecting the previous camera frame in the image data captured by the side mono camera at the previous time step and the camera frame captured by the front mono camera at the current time step.

19. The method of claim 16, wherein the method further comprises:
solving for an area of overlap between a front field-of-view captured by the front mono camera and a side field-of-view captured by the side mono camera;
solving a convex optimization problem by plotting a relationship between a convex cost function and the ideal lagged distance, wherein the relationship between the convex cost function and the ideal lagged distance is represented by a parabola; and
selecting a local minima of the parabola as the ideal lagged distance.

20. A monocular camera system for a vehicle, the monocular camera system comprising:
a front mono camera positioned at a front portion of the vehicle;
a side mono camera positioned along a side of the vehicle; and
one or more controllers in electronic communication with the front mono camera and the side mono camera, the one or more controllers executing instructions to:
collect image data captured by the front mono camera and the side mono camera, wherein the image data includes an object being evaluated;
determine an ideal lagged distance the vehicle travels between a current time step and a previous time step as two asynchronous camera frames are captured by the front mono camera and the side mono camera, wherein determining the ideal lagged distance comprises:
solving for an area of overlap between a front field-of-view captured by the front mono camera and a side field-of-view captured by the side mono camera;
solving a convex optimization problem by plotting a relationship between a convex cost function and the ideal lagged distance, wherein the relationship between the convex cost function and the ideal lagged distance is represented by a parabola; and
selecting a local minima of the parabola as the ideal lagged distance;
determine a number of delayed frames captured by either the front mono camera or the side mono camera between the current time step and the previous time step based on the ideal lagged distance;
determine a direction of travel of the vehicle, wherein the direction of travel of the vehicle indicates which mono camera is selected to provide a previous camera frame captured at the previous time step;
perform feature matching to identify pixel positions in a camera frame captured by the front mono camera and a camera frame captured by the side mono camera that correspond to the same three-dimensional coordinates of the object being evaluated; and
perform triangulation of the pixel positions captured by the front mono camera and the side mono camera to determine the three-dimensional coordinates of the object being evaluated.

* * * * *